(12) United States Patent
Jung

(10) Patent No.: US 11,287,834 B2
(45) Date of Patent: Mar. 29, 2022

(54) PLATOONING CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Ui Jung Jung, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 268 days.

(21) Appl. No.: 16/533,055

(22) Filed: Aug. 6, 2019

(65) Prior Publication Data

US 2020/0326728 A1 Oct. 15, 2020

(30) Foreign Application Priority Data

Apr. 15, 2019 (KR) .......................... 10-2019-0043856

(51) Int. Cl.
*G05D 1/02* (2020.01)
*G07C 5/08* (2006.01)
*G07C 5/00* (2006.01)

(52) U.S. Cl.
CPC ........... *G05D 1/0293* (2013.01); *G07C 5/008* (2013.01); *G07C 5/0808* (2013.01); *G07C 5/0816* (2013.01)

(58) Field of Classification Search
CPC ............... G05D 1/0293; G05D 1/0055; G05D 2201/0213; G05D 1/0291; G07C 5/0816; G07C 5/0808; G07C 5/008; G07C 5/0825; G08G 1/22; B60W 30/165; B60W 50/0205; B60W 2050/0215; B60W 50/02; B60W 50/14; B60W 2554/80; B60Y 2306/15
See application file for complete search history.

(56) References Cited

U.S. PATENT DOCUMENTS

| 9,187,095 B2 | 11/2015 | Gerdt |
| 9,645,579 B2 | 5/2017 | Switkes et al. |
| 2010/0256852 A1* | 10/2010 | Mudalige ................. G08G 1/22 701/24 |
| 2012/0330527 A1* | 12/2012 | Kumabe ............... B60W 40/04 701/96 |
| 2018/0053403 A1* | 2/2018 | Wieskamp .............. H04L 47/14 |
| 2019/0073908 A1* | 3/2019 | Neubecker ....... G08G 1/096725 |

FOREIGN PATENT DOCUMENTS

| KR | 10-2016-0037544 A | 4/2016 |
| KR | 10-1745156 B1 | 6/2017 |
| KR | 10-2017-0118490 A | 10/2017 |

* cited by examiner

*Primary Examiner* — Michael V Kerrigan
(74) *Attorney, Agent, or Firm* — Morgan, Lewis & Bockius LLP

(57) ABSTRACT

A platoon controller may include a processor that determines whether there is a failure in a sensor mounted in at least one of platooning vehicles forming a platooning group, receives a plurality of information between a breakdown vehicle in the platooning group and a forward vehicle in front of the breakdown vehicle from the forward vehicle in front of the breakdown vehicle and at least one or more following vehicles behind the breakdown vehicle among the platooning vehicles, and continues performing platooning control and a storage that stores information received from the at least one or more following vehicles.

18 Claims, 10 Drawing Sheets

PLATOONING CONTROLLER, SYSTEM INCLUDING THE SAME, AND METHOD THEREOF

CROSS-REFERENCE TO RELATED APPLICATION

The present application claims priority to Korean Patent Application No. 10-2019-0043856, filed on Apr. 15, 2019, the entire contents of which is incorporated herein for all purposes by this reference.

BACKGROUND OF THE INVENTION

Field of the Invention

The present invention relates to a platooning controller, a system including the same, and a method thereof, and more particularly, relates to technologies of coping when a sensor fails during platooning.

Description of Related Art

Technologies of moving vehicles with autonomous driving without user maneuvers have been developed. As one of the methods, there is platooning of forming a platoon and performing autonomous driving when several vehicles travel on the same path.

Such platooning may be performed using vehicle-to-vehicle (V2V) communication, cognitive sensors of vehicles, and the like. In other words, the platooning is able to transmit and receive information for platooning control through V2V communication, determine an interval between vehicles, locations of the vehicles, and the like by cognitive sensors such as a radar, a light detection and ranging (LiDAR), and a camera of each of the vehicles, and perform platooning control.

When there is a failure in a cognitive sensor of a platooning vehicle during platooning, the platooning vehicle does not recognize the occurrence of such a failure, may share incorrect information between vehicles included in a platooning group, and may perform platooning, thus leading to a very serious accident.

Thus, when there is a failure in the cognitive sensor of the platooning vehicle, there is a demand for technologies capable of recognizing and coping with the occurrence of the failure.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a platooning controller for collecting information for platooning control from following vehicles which follow a breakdown vehicle when there is a failure in a sensor of at least one of platooning vehicles included in the platooning group during platooning and continuing performing safe platooning control, a system including the same, and a method thereof.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a platooning controller may include: a processor that determines whether there is a failure in a sensor mounted in at least one of platooning vehicles forming a platooning group, receives a plurality of information between a breakdown vehicle among the platooning vehicles, including the sensor which fails, in the platooning group and a forward vehicle in front of the breakdown vehicle from the forward vehicle in front of the breakdown vehicle and at least one or more following vehicles behind the breakdown vehicle among the platooning vehicles, and continues performing platooning control and a storage that stores information received from the at least one or more following vehicles.

In an exemplary embodiment of the present invention, the processor may warn a user that the sensor fails or provide a transition demand to the user, when the sensor fails.

In an exemplary embodiment of the present invention, the processor may determine whether it is possible to perform vehicle-to-vehicle (V2V) communication, when the sensor fails.

In an exemplary embodiment of the present invention, the processor may notify the forward vehicle and the at least one or more following vehicles in the platooning group that the sensor fails, when the sensor fails.

In an exemplary embodiment of the present invention, the processor may receive and fuse the plurality of information between the breakdown vehicle and the forward vehicle in front of the breakdown vehicle from the forward vehicle in front of the breakdown vehicle and the following vehicles which follow the breakdown vehicle.

In an exemplary embodiment of the present invention, the processor may determine a mean value of the plurality of information between the breakdown vehicle and the forward vehicle in front of the breakdown vehicle, the plurality of information being received from the forward vehicle in front of the breakdown vehicle and the following vehicles and may perform platooning control of the breakdown vehicle based on the mean value.

In an exemplary embodiment of the present invention, the processor may transmit information for controlling bias lateral wave driving of the following vehicles to the following vehicles.

In an exemplary embodiment of the present invention, the information for controlling the bias lateral wave driving of the following vehicles may include information related to lateral locations of the following vehicles or information related to heading angles of the following vehicles.

In an exemplary embodiment of the present invention, the processor may control the bias lateral wave driving of the following vehicles, such that the breakdown vehicle and the forward vehicle in front of the breakdown vehicle are included in a sensing area by sensors of the following vehicles.

In an exemplary embodiment of the present invention, the processor may determine information related to a distance, a relative speed, and relative acceleration between the breakdown vehicle and the forward vehicle in front of the breakdown vehicle and transmit the determined information to the breakdown vehicle, when receiving a notification that a breakdown occurs from at least one of platooning vehicles in the platooning group.

In an exemplary embodiment of the present invention, the processor may determine the distance between the breakdown vehicle and the forward vehicle in front of the breakdown vehicle based on a distance between a host vehicle among the platooning vehicles and the breakdown vehicle and a length of the breakdown vehicle, and a distance between a host vehicle among the platooning vehicles and the forward vehicle in front of the breakdown vehicle.

In an exemplary embodiment of the present invention, the processor may determine a relative speed between a host vehicle and the breakdown vehicle.

In an exemplary embodiment of the present invention, the processor may receive and fuse a plurality of information between the breakdown vehicle and the forward vehicle in front of the breakdown vehicle from another vehicle which does not belong to the platooning group as well as the following vehicles.

According to various aspects of the present invention, a vehicle system may include: a sensing module that detects information for platooning control and a platooning controller that determines whether there is a failure in the sensing module of at least one of platooning vehicles, receives a plurality of information between a breakdown vehicle among the platooning vehicles, including the sensing module which fails, and a forward vehicle in front of the breakdown vehicle from the forward vehicle in front of the breakdown vehicle and at least one or more following vehicles behind the breakdown vehicle among the platooning vehicles, and continues performing platooning control.

According to various aspects of the present invention, a drowsiness management method may include: determining whether there is a failure in a sensor mounted in at least one of platooning vehicles forming a platooning group, notifying a forward vehicle in front of a breakdown vehicle, including the sensor which fails, and at least one or more following vehicles behind the breakdown vehicle among the platooning vehicles that the sensor fails, when the sensor fails, receiving a plurality of information between the breakdown vehicle and the forward vehicle in front of the breakdown vehicle from the forward vehicle in front of the breakdown vehicle and the at least one or more following vehicles and fusing the plurality of information received from the forward vehicle in front of the breakdown vehicle and the at least one or more following vehicles and performing platooning control.

In an exemplary embodiment of the present invention, the platooning control method may further include warning a user that the sensor fails or provide a transition demand to the user, when the sensor fails and determining whether it is possible to perform vehicle-to-vehicle (V2V) communication, when the sensor fails.

In an exemplary embodiment of the present invention, the fusing of the plurality of received information and the performing of the platooning control may include determining a mean value of the plurality of information between the breakdown vehicle and the forward vehicle in front of the breakdown vehicle, the plurality of information being received from the forward vehicle in front of the breakdown vehicle and the following vehicles and performing platooning control of the breakdown vehicle based on the mean value.

In an exemplary embodiment of the present invention, the platooning control method may further include transmitting information for controlling bias lateral wave driving of the following vehicles to the following vehicles.

In an exemplary embodiment of the present invention, the platooning control method may further include controlling bias lateral wave driving of the following vehicles, such that the breakdown vehicle and the forward vehicle in front of the breakdown vehicle are included in a sensing area by sensors of the following vehicles.

In an exemplary embodiment of the present invention, the plurality of information between the breakdown vehicle and the forward vehicle may include information related to a distance, a relative speed, and relative acceleration between the breakdown vehicle and the forward vehicle in front of the breakdown vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS present invention in conjunction with the accompanying drawings.

Figure 1:
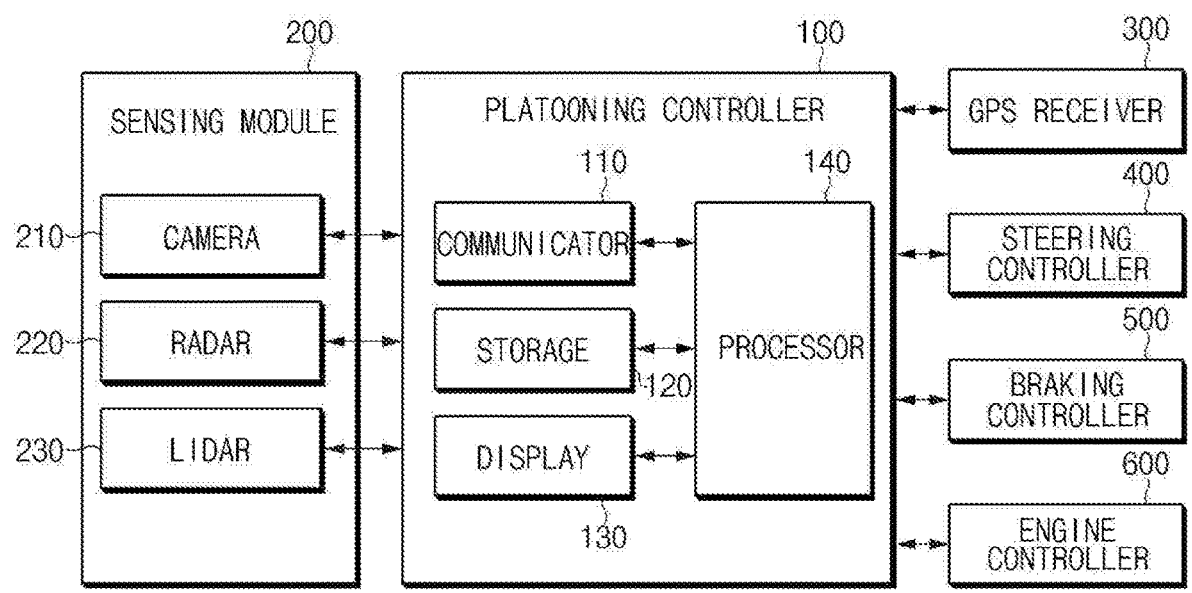
FIG. 1 is a block diagram illustrating a configuration of a vehicle system including a platooning controller according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present invention includes technologies of collecting information related to following vehicles and continuing performing platooning control, when there is a failure in a cognitive sensor of at least one of platooning vehicles.

Hereinafter, a description will be provided in detail of embodiments of the present invention with reference to FIGS. 1 to 10.

FIG. 1 is a block diagram illustrating a configuration of a vehicle system including a platooning controller according to an exemplary embodiment of the present invention.

Referring to FIG. 1, the vehicle system according to an exemplary embodiment of the present invention may include a platooning controller 100, a sensing module 200, a global positioning system (GPS) receiver 300, a steering controller 400, a braking controller 500, and an engine controller 600.

The platooning controller 100 may determine whether there is a failure in a sensor module 200 of at least one of platooning vehicles. When the sensing module 200 fails, the platooning controller 100 may receive information between the breakdown vehicle in the platooning group and a forward vehicle in front of the breakdown vehicle from at least one or more following vehicles and may continue performing platooning control.

Furthermore, the platooning controller 100 may transmit information for controlling bias lateral wave driving of following vehicles and controlling heading angles of the following vehicles such that the breakdown vehicle and a forward vehicle in front of the breakdown vehicle are included in sensing areas of sensing modules of the following vehicles.

To the present end, the platooning controller 100 may include a communicator 110, a storage 120, a display 130, and a processor 140.

The communicator 110 may be a hardware device implemented with various electronic circuits to transmit and receive a signal over a wireless or wired connection. In an exemplary embodiment of the present invention, the communicator 110 may perform inter-vehicle communication through controller area network (CAN) communication, local interconnect network (LIN) communication, or the like and may communicate with the sensing module 200, the Global Positioning System (GPS) receiver 300, the steering controller 400, the braking controller 500, the engine controller 600, or the like. Furthermore, the communicator 110 may perform vehicle-to-vehicle (V2V) communication with surrounding vehicles for platooning and may perform communication such as dedicated short range communication (DSRC), wireless access in vehicular environment (WAVE), or long term evolution (LTE).

The storage 120 may store a detecting result of the sensing module 200, and information received from the at least one or more following vehicles the like obtained by the processor 140. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may display occurrence of a breakdown during platooning, a V2V communication error state, or a screen for transition demand (TD). The display 130 may be implemented as a head-up display (HUD), a cluster, an audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected to the communicator 110, the storage 120, the display 130, or the like and may electrically control the respective components. The processor 140 may be an electrical circuit which executes instructions of software and may perform a variety of data processing and calculation described below.

The processor 140 may determine whether there is a failure in a sensor mounted in at least one of platooning vehicles forming a platooning group. When the sensor fails, the processor 140 may receive information between the breakdown vehicle in the platooning group and a forward vehicle in front of the breakdown vehicle from at least one or more following vehicles and the forward vehicle in front of the breakdown vehicle an may continue performing platooning control.

When the sensing module 200 fails, the processor 140 may warn a user that the sensing module 200 fails or may provide a transition demand to the user. In the present case, the failure of the sensing module 200 may include failures of at least one or more of a camera 210, a radar 220, and a light detection and ranging (LiDAR) 230.

When the sensing module 200 fails, the processor 140 may determine whether it is possible to perform V2V communication. When it is impossible to perform the V2V communication, the processor 140 may notify the user of a V2V communication error state.

When it is possible to perform the V2V communication and when the sensing module 220 fails, the processor 140 may notify platooning vehicles that the sensing module 200 fails and may receive and fuse a plurality of information between the breakdown vehicle in the platooning group and a forward vehicle in front of the breakdown vehicle from the forward vehicle in front of the breakdown vehicle and following vehicles behind the breakdown vehicle. In other words, the processor 140 may calculate a productive/probabilistic mean value of the plurality of information between the breakdown vehicle in the platooning group and the forward vehicle in front of the breakdown vehicle from the following vehicles and may perform platooning control of the breakdown vehicle based on the mean value.

The processor 140 may transmit information for controlling bias lateral wave driving of following vehicles to the following vehicles. The information for controlling the bias lateral wave driving of the following vehicles may include information related to lateral locations of the following vehicles or information related to heading angles of the following vehicles. In the instant case, at least one of a leading vehicle loaded with the processor 140, a forward vehicle in front of the breakdown vehicle, or the breakdown vehicle may transmit information for controlling bias lateral wave driving of the following vehicles to the following vehicles.

In other words, the processor 140 may control bias lateral wave driving of the following vehicles such that the leading vehicle, the breakdown vehicle, and the forward vehicle in front of the breakdown vehicle are included in sensing areas by sensors of the following vehicles.

When receiving a notification that a breakdown occurs from at least one of platooning vehicles in a platooning group, the processor 140 may determine information related to a distance, a relative speed, and relative acceleration between the breakdown vehicle and a forward vehicle in front of the breakdown vehicle and may transmit the determined information to the breakdown vehicle. In the instant case, the breakdown vehicle may receive information related to a distance, a relative speed, and relative acceleration between the breakdown vehicle and the forward vehicle in front of the breakdown vehicle from the forward vehicle in front of the breakdown vehicle provided with the processor 140 and following vehicles behind the breakdown vehicle.

The processor 140 may determine the distance between the breakdown vehicle and the forward vehicle in front of the breakdown vehicle based on a distance between a host vehicle among the platooning vehicles and the breakdown vehicle and a length of the breakdown vehicle, and a distance between a host vehicle among the platooning vehicles and the forward vehicle in front of the breakdown vehicle the breakdown vehicle, and a length of the breakdown vehicle.

The processor 140 may determine a relative speed between a host vehicle (e.g., the following vehicle which follows the breakdown vehicle) and the breakdown vehicle and may transmit the determined relative speed to the breakdown vehicle.

The processor 140 of the platooning controller 100 of a vehicle, a breakdown of which occurs, may fuse information related to relative speeds between the breakdown vehicle and a forward vehicle in front of the breakdown vehicle, collected from the forward vehicle in front of the breakdown vehicle and following vehicles behind the breakdown vehicle to determine the final relative speed between the breakdown vehicle and the forward vehicle in front of the breakdown vehicle.

The processor 140 may determine a relative speed between a host vehicle (e.g., the following vehicle which follows the breakdown vehicle) and the breakdown vehicle and may transmit the determined relative speed to the breakdown vehicle. The processor 140 of the platooning controller 100 of a vehicle, a breakdown of which occurs, may fuse information related to relative acceleration between the breakdown vehicle and the forward vehicle in front of the breakdown vehicle, collected from the forward vehicle in front of the breakdown vehicle and following vehicles, to determine the final relative acceleration between the breakdown vehicle and the forward vehicle in front of the breakdown vehicle.

The processor 140 may receive and fuse a plurality of information between the forward vehicle in front of the breakdown vehicle and the breakdown vehicle from another vehicle which does not belong to the platooning group as well as the following vehicles to use the fused information for platooning control.

The sensing module 200 may include a plurality of sensors to detect an object outside the host vehicle and may obtain information related to a location of the object outside the host vehicle, a speed of the object outside the host vehicle, a movement direction of the object outside the host vehicle, and/or a type (e.g., a vehicle, a pedestrian, a bicycle, a motorcycle, or the like) of the object outside the host vehicle. To the present end, the sensing module 200 may include the camera 210, the radar 220, the LiDAR 230, or the like and may further include an ultrasonic sensor, a laser scanner and/or a corner radar, a LiDAR, an acceleration sensor, a yaw rate sensor, a torque sensor and/or a wheel speed sensor, a steering angle sensor, or the like. In an exemplary embodiment of the present invention, the processor 140 may obtain information related to a leading vehicle and a forward vehicle during platooning by the sensing module 200. Furthermore, the sensing module 200 may enhance the reliability of the detecting result by integrating and using information related to a plurality of various sensors. The camera 210, the radar 220, the LiDAR 230, and the like of the sensing module 200 may be mounted on front and rear portions of the vehicle.

The GPS receiver 300 may receive a GPS signal and may provide the received GPS signal to obtain location information related to the host vehicle.

The steering controller 400 may be configured to control a steering angle of the host vehicle and may include a steering wheel, an actuator interlocked with the steering wheel, and a controller for controlling the actuator.

The braking controller 500 may be configured to control to brake the host vehicle and may include a controller for controlling a brake.

The engine controller 600 may be configured to control to drive an engine of the host vehicle and may include a controller for controlling a speed of the host vehicle.

Accordingly, in an exemplary embodiment of the present invention, when there is a failure of a cognitive sensor (a sensing module) of at least one following vehicle among platooning vehicles, a forward vehicle in front of the breakdown vehicle and following vehicles behind the breakdown vehicle may recognize and measure information (e.g., a distance, a relative speed, or relative acceleration) between the breakdown vehicle and the forward vehicle, and the breakdown vehicle may fuse and use values received the following vehicles to perform its platooning control.

Furthermore, in case that following vehicles which follow a breakdown vehicle recognize and measure the breakdown vehicle and a forward vehicle in front of the breakdown vehicle, an exemplary embodiment of the present invention may control such that the following vehicles perform bias driving or lateral wave driving to prevent the following vehicles from being hidden due to characteristics of platooning vehicles which are traveling in a line.

Hereinafter, a description will be provided of an example of platooning control for a breakdown BV when a leading vehicle LV, a forward vehicle BVFV in front of the breakdown vehicle BV, the breakdown vehicle BV, and following vehicles FV1 to FVn behind the breakdown vehicle BV are traveling in a line.

Figure 2:
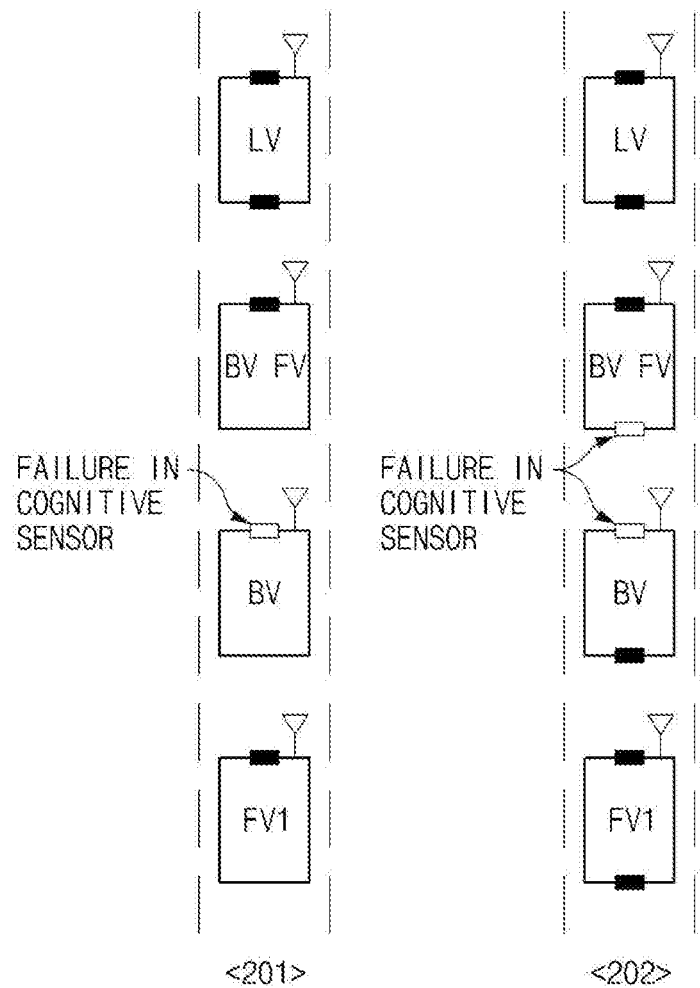
FIG. 2 is a drawing illustrating an example in which a breakdown vehicle receives platooning control information from following vehicles according to an exemplary embodiment of the present invention.

FIG. 2 is a drawing illustrating an example in which a breakdown vehicle receives platooning control information from following vehicles according to an exemplary embodiment of the present invention. Reference number 201 of FIG. 2 indicates that there is a failure in a cognitive sensor located in a front portion of a breakdown vehicle BV among vehicles which follow a leading vehicle LV. Reference number 202 of FIG. 2 indicates that there are failures in both of a rear cognitive sensor of the leading vehicle LV and a front cognitive sensor of the breakdown vehicle BV.

When there is a failure in the cognitive sensor located in the front portion of the breakdown vehicle BV like reference number 201, it is configured to perform platooning control of the breakdown vehicle BV based on information by a rear cognitive sensor of a forward vehicle BVFV.

However, when there are failures in both the rear cognitive sensor of the forward vehicle BVFV and the front cognitive sensor of the breakdown vehicle BV like reference number 202, the breakdown vehicle BV may receive information (e.g., a distance, a relative speed, acceleration, or the like between the leading vehicle LV and the breakdown vehicle BV) from following vehicles FV1 and FV2 which follow the breakdown vehicle BV and may perform platooning control.

Figure 3:
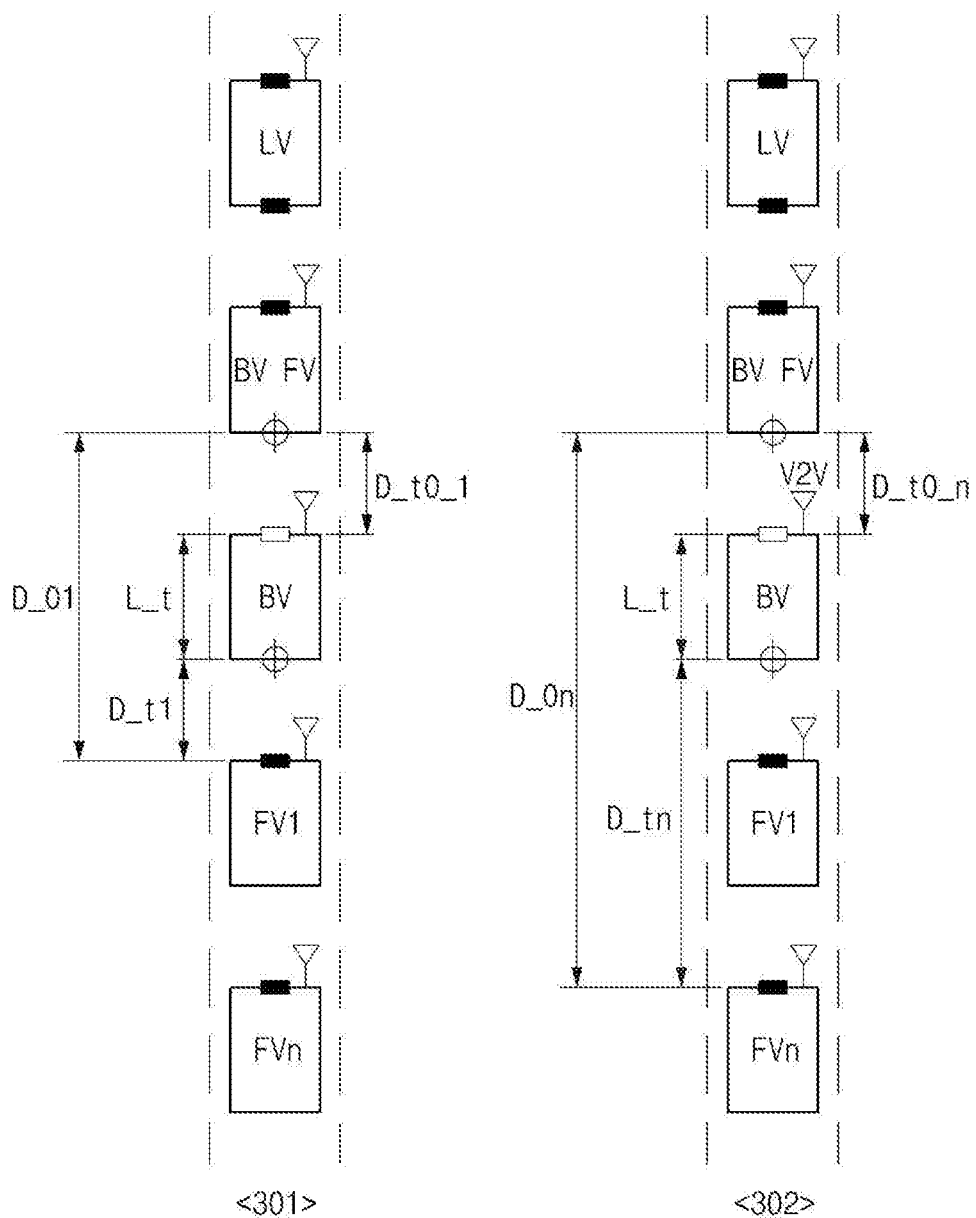
FIG. 3 is a drawing illustrating information received from following vehicles at a breakdown vehicle according to an exemplary embodiment of the present invention.

FIG. 3 is a drawing illustrating information received from following vehicles at a breakdown vehicle according to an exemplary embodiment of the present invention. In other words, FIG. 3 is a drawing illustrating information received from following vehicles FV1 and FV2 which follow a breakdown vehicle BV at the breakdown vehicle BV when there are failures in both of a rear cognitive sensor of a forward vehicle BVFV and a front cognitive sensor of the breakdown vehicle BV in FIG. 2.

Referring to reference numeral 301 of FIG. 3, the following vehicle FV1 may determine information between the breakdown vehicle BV and the forward vehicle BVFV, for example, a distance $D\_t0\_1$ between the forward vehicle BVFV and the breakdown vehicle BV, a relative speed $V\_t0\_1$ between the forward vehicle BVFV and the breakdown vehicle BV, and relative acceleration $A\_t0\_1$ between the forward vehicle BVFV and the breakdown vehicle BV.

TABLE 1

Values obtained by FV1:
Distance: $D\_t0\_1 = D01 - D\_t1 - L\_t$

TABLE 1-continued

Speed: $V\_t0\_1 = V\_01 - V\_t1$
Acceleration: $A\_t0\_1 = A\_01 - A\_t1$
.
.
.
Values obtained by FVn:
Distance: $D\_t0\_n = D0n - D\_tn - L\_t$
Speed: $V\_t0\_n = V\_0n - V tn$
Acceleration: $A\_t0\_n = A\_0n - A\_tn$ Like Table 1 above, the following vehicle FV1 may determine the distance $D\_t0\_1$ between the forward vehicle BVFV and the breakdown vehicle BV by subtracting a distance $D\_t1$ between the breakdown vehicle BV and the following vehicle FV1 and a length $L\_t$ of the breakdown vehicle BV from a distance $D\_01$ between the forward vehicle BVFV and the following vehicle FV1.

Like Table 1 above, the following vehicle FV1 may determine the relative speed $V\_t0\_1$ between the forward vehicle BVFV and the breakdown vehicle BV by subtracting a relative speed $V\_t1$ between the breakdown vehicle BV and the following vehicle FV1 from a relative speed $V\_01$ between the forward vehicle BVFV and the following vehicle FV1.

Like Table 1 above, the following vehicle FV1 may determine the relative acceleration $A\_t0\_1$ between the forward vehicle BVFV and the breakdown vehicle BV by subtracting relative acceleration $A\_t1$ between the breakdown vehicle BV and the following vehicle FV1 from relative acceleration $A\_01$ between the forward vehicle BVFV and the following vehicle FV1.

Referring to reference numeral 302 of FIG. 3, the following vehicle FVn may determine a distance $D\_t0\_n$ between the forward vehicle BVFV and the breakdown vehicle BV, a relative speed $V\_t0\_n$ between the forward vehicle BVFV and the breakdown vehicle BV, and relative acceleration $A\_t0\_n$ between the forward vehicle BVFV and the breakdown vehicle BV.

Like Table 1 above, the following vehicle FVn may determine the distance $D\_t0\_n$ between the forward vehicle BVFV and the breakdown vehicle BV by subtracting a distance $D\_tn$ between the breakdown vehicle BV and the following vehicle FVn and a length $L\_t$ of the breakdown vehicle BV from a distance $D\_0n$ between the forward vehicle BVFV and the following vehicle FVn.

Like Table 1 above, the following vehicle FVn may determine the relative speed $V\_t0\_n$ between the forward vehicle BVFV and the breakdown vehicle BV by subtracting a relative speed $V\_tn$ between the breakdown vehicle BV and the following vehicle FVn from a relative speed $V\_0n$ between the forward vehicle BVFV and the following vehicle FVn.

Furthermore, like Table 1 above, the following vehicle FVn may determine the relative acceleration $A\_t0\_n$ between the forward vehicle BVFV and the breakdown vehicle BV by subtracting relative acceleration $A\_tn$ between the breakdown vehicle BV and the following vehicle FVn from relative acceleration $A\_0n$ between the forward vehicle BVFV and the following vehicle FVn.

Thus, the breakdown vehicle BV may fuse information (e.g., the distance, the relative speed, and the relative acceleration) collected from the respective following vehicles FV1 to FVn to determine a mean value as Equations 1 and 2 below.

$$x_{fused} = \begin{pmatrix} D\_t0\_fused \\ V\_t0\_fused \\ A\_t0\_fused \end{pmatrix},$$ [Equation 1]

$$x_k = \begin{pmatrix} D\_t0\_k \\ V\_t0\_k \\ A\_t0\_k \end{pmatrix},$$

$$\sigma_k$$

$$x_{fused} = \frac{\sum_{k=1}^{n} \sigma_k^{-2} x_k}{\sum_{k=1}^{n} \sigma_k^{-2}}$$ [Equation 2]

$\sigma_k$ refers to the noise covariance of the following vehicle K, and $X_{fused}$ refers to information obtained by fusing the information received from the following vehicles.

For example, when the signal of the following vehicle K is omitted, a value of $\sigma_k^{-2}$ may be set to "0" and the fused value may be obtained by only using information related to the other following vehicles.

Figure 4:
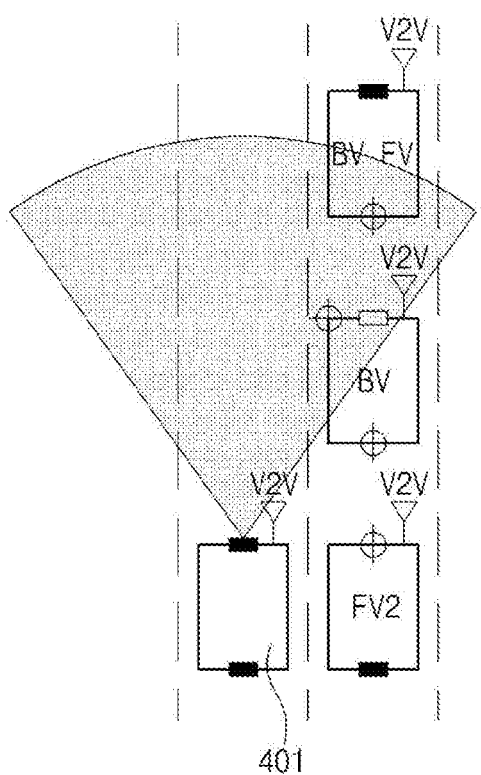
FIG. 4 is a drawing illustrating an example in which a breakdown vehicle receives platooning control information from any vehicle which does not belong to a platooning group according to various exemplary embodiments of the present invention.

FIG. 4 is a drawing illustrating an example in which a breakdown vehicle receives platooning control information from any vehicle which does not belong to a platooning group according to various exemplary embodiments of the present invention.

Referring to FIG. 4, a breakdown vehicle BV may receive a distance between a forward vehicle BVFV and the breakdown vehicle BV, a relative speed between the forward vehicle BVFV and the breakdown vehicle BV, and relative acceleration between the forward vehicle BVFV and the breakdown vehicle BV from another vehicle 401 as well as a following vehicle in the platooning group and may perform platooning control. In other words, the breakdown vehicle may collect and fuse information from surrounding vehicles as well as following vehicles during platooning to more enhance accuracy.

Figure 5:
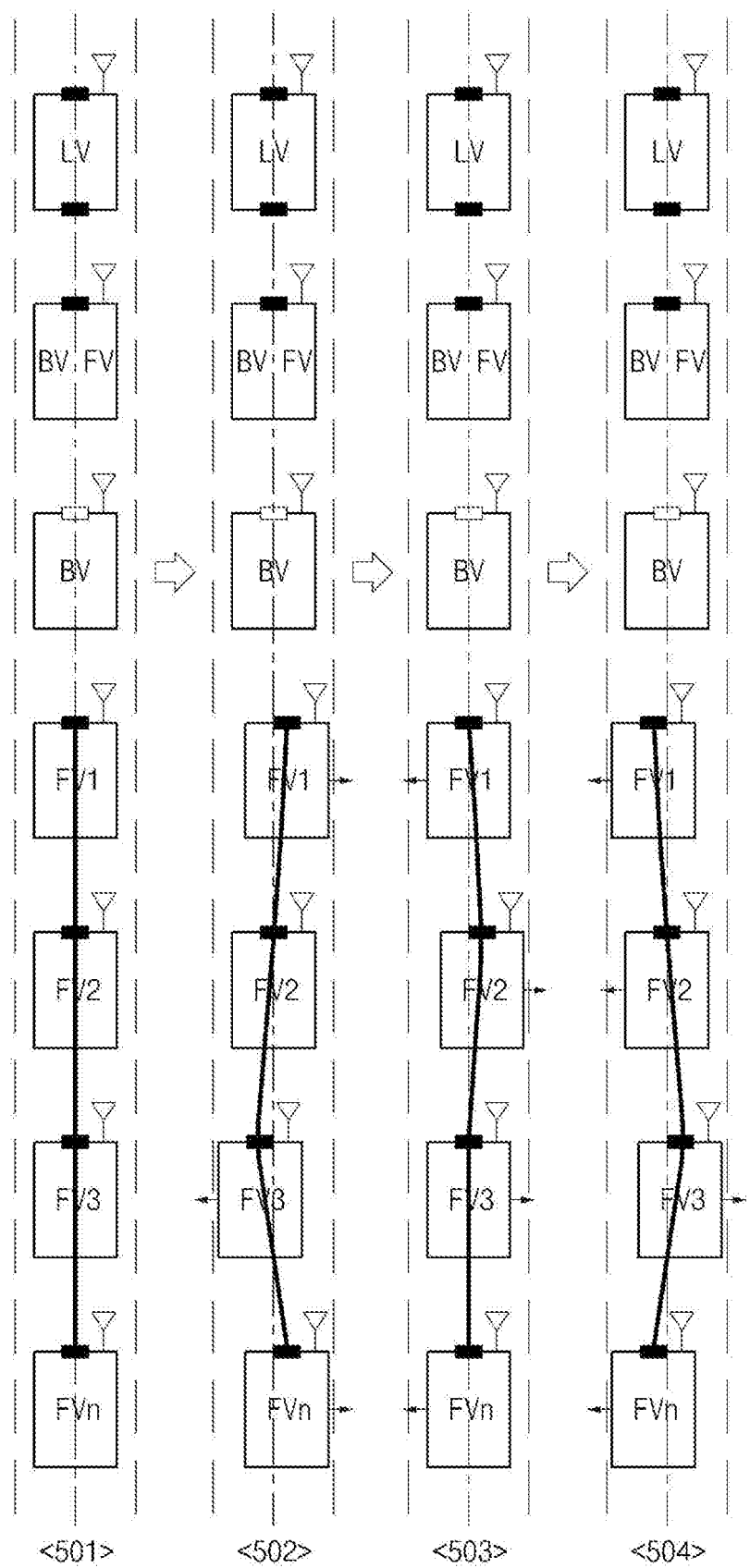
FIG. 5 is a drawing illustrating an example of controlling lateral wave driving of following vehicles according to an exemplary embodiment of the present invention.

FIG. 5 is a drawing illustrating an example of controlling lateral wave driving of following vehicles according to an exemplary embodiment of the present invention.

Reference numeral 501 of FIG. 5 includes an example in which following vehicles FV1 to FVn are driving in a line in the same lateral direction thereof. When the following vehicles FV1 to FVn are driving in a line in the same lateral direction thereof, because each of the following vehicles FV1 to FVn is hidden by the vehicle in front of it, it is difficult to recognize a distance or the like between a forward vehicle BVFV and a host vehicle. Thus, like reference numerals 502 to 504, by varying a bias of each of the following vehicles FV1 to FVn such that lateral locations of the following vehicles FV1 to FVn are misaligned a little, the following vehicles FV1 to FVn may perform lateral wave driving (zig-zag driving) such that the respective following vehicles FV1 to FVn recognize a distance from the forward vehicle BVFV. Thus, a minimum of two or more following vehicles may alternately recognize the forward vehicle BVFV and a breakdown vehicle BV.

Figure 6:
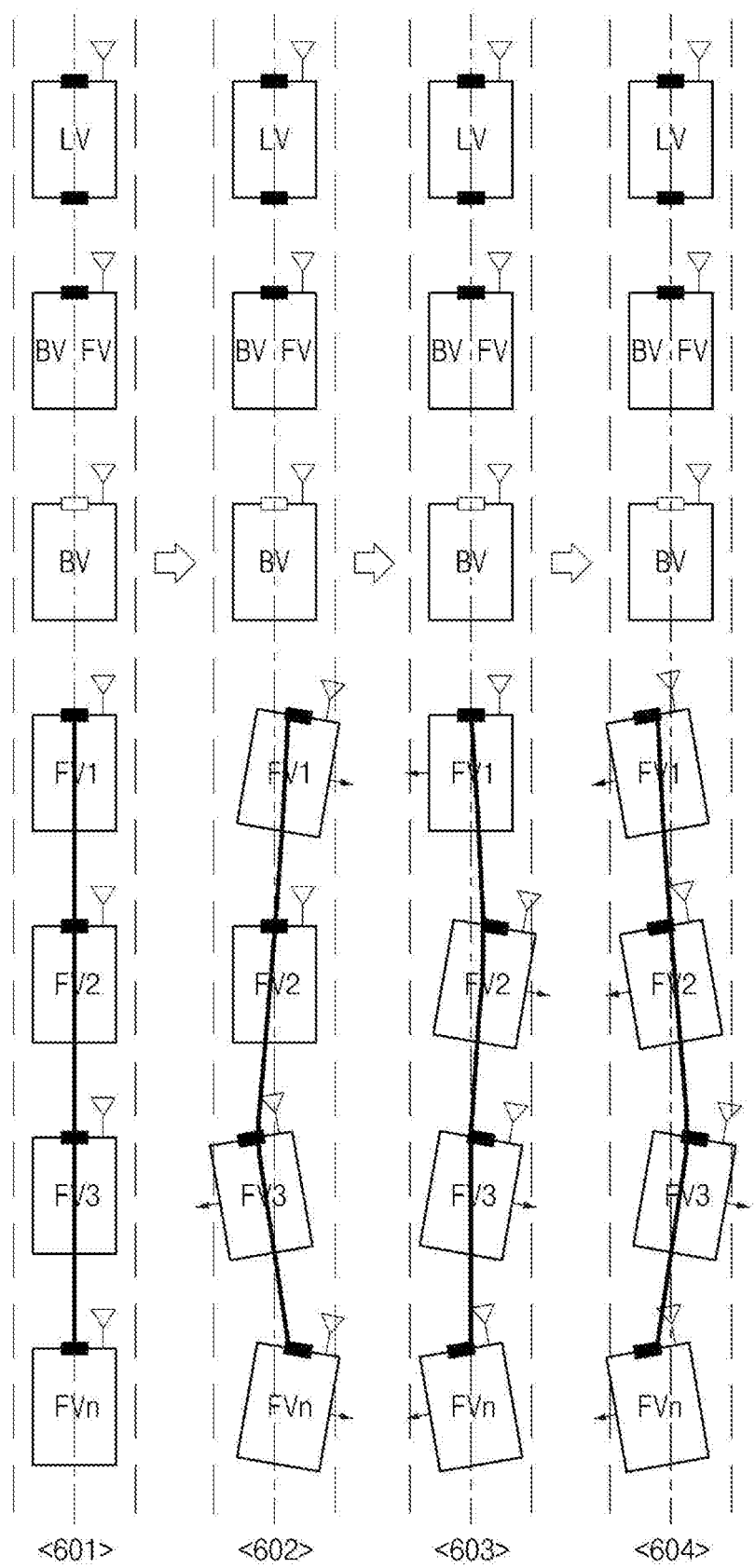
FIG. 6 is a drawing illustrating an example of controlling lateral wave driving of following vehicles according to various exemplary embodiments of the present invention.

FIG. 6 is a drawing illustrating an example of controlling lateral wave driving of following vehicles according to various exemplary embodiments of the present invention.

Reference numeral 601 of FIG. 6 includes a situation where it is difficult to recognize a forward vehicle BVFV like reference numeral 501 of FIG. 5 because each of following vehicles FV1 to FVn is hidden behind the vehicle in front of it. Thus, in reference numerals 602 to 604, the following vehicles FV1 to FVn may perform lateral wave driving. By adjusting a heading angle of each of the following vehicles FV1 to FVn, the respective following vehicles FV1 to FVn may very well recognize the forward vehicle BVFV and a breakdown vehicle BV. In a case of adjusting the heading angle, it is advantageous to better recognize a leading vehicle and a breakdown vehicle on a curved road.

Figure 7:
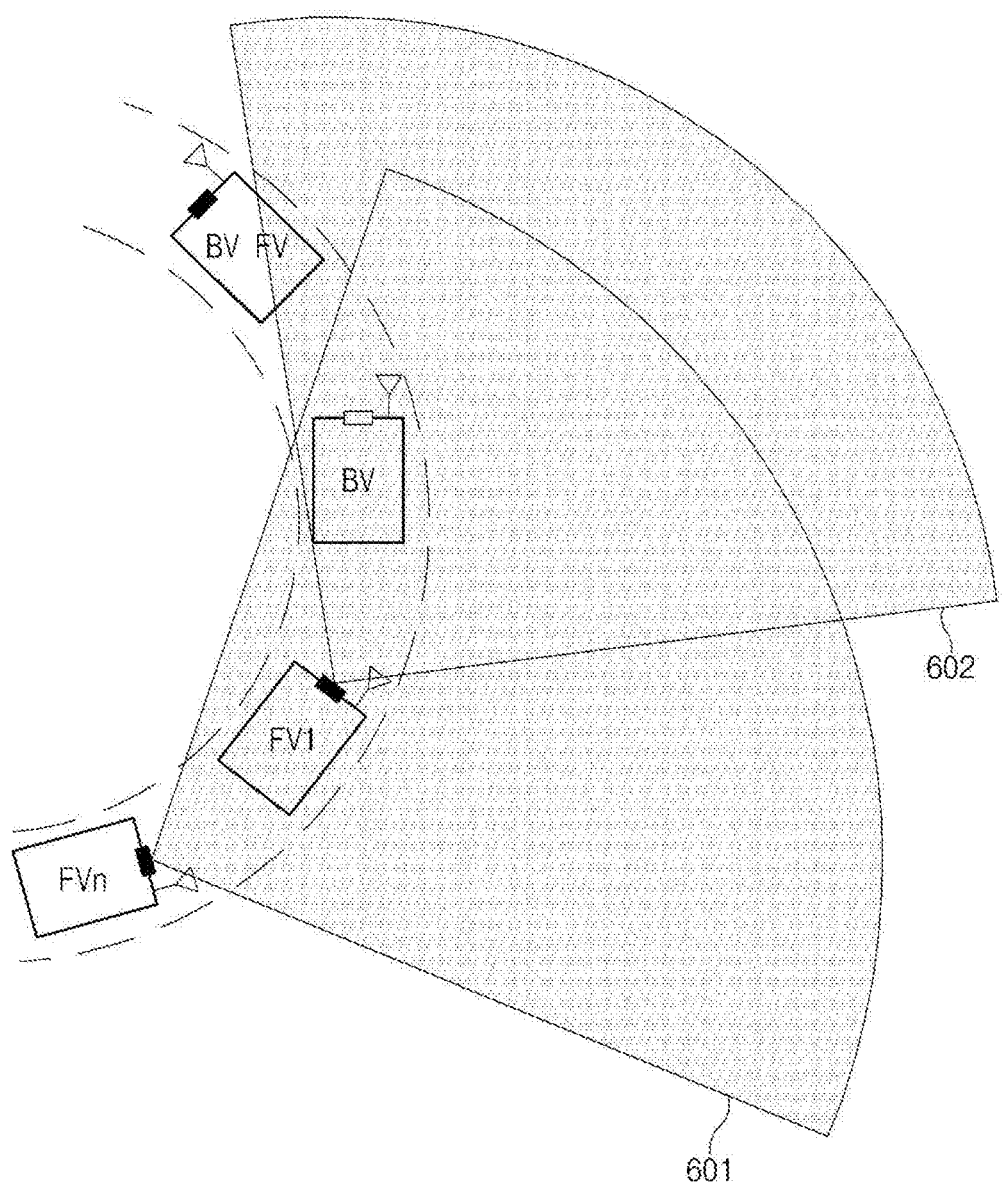
FIG. 7 is a drawing illustrating a change of a sensing area on a curved road according to an exemplary embodiment of the present invention.
Figure 8:
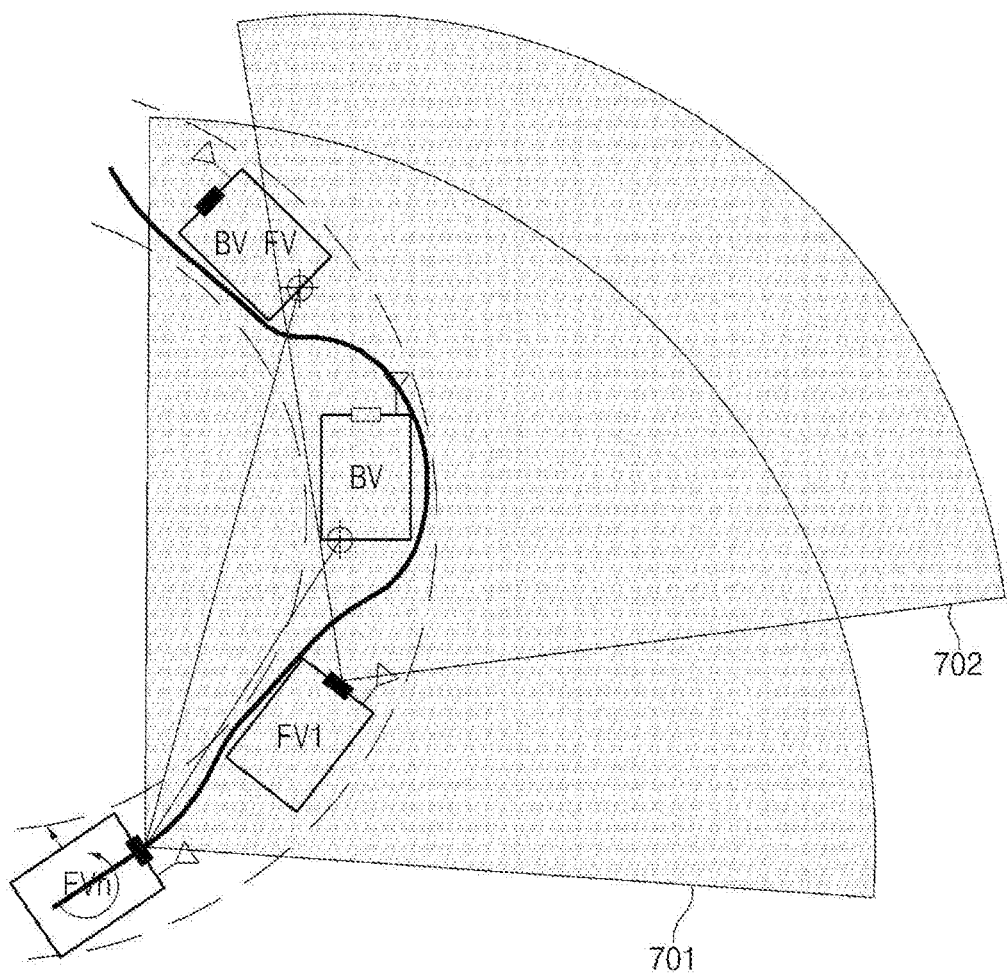
FIG. 8 is a drawing illustrating an example of controlling lateral wave driving on a curved road according to various exemplary embodiments of the present invention.

FIG. 7 is a drawing illustrating a change of a sensing area on a curved road according to an exemplary embodiment of the present invention. FIG. 8 is a drawing illustrating an example of controlling lateral wave driving on a curved road according to various exemplary embodiments of the present invention.

Referring to FIG. 7, when a forward vehicle BVFV in front of a breakdown vehicle BV, the breakdown vehicle BV, and following vehicles FV1 to FVn are traveling on a curved road, the forward vehicle BVFV may depart form a sensing area of a sensor module 200 of the following vehicle FVn. Thus, like FIG. 8, a heading angle of the following vehicle FVn may be adjusted such that both of the forward vehicle BVFV and the breakdown vehicle BV are included in the sensing area of the sensor module 200 of the following vehicle FVn. The forward vehicle BVFV or the breakdown vehicle BV may transmit the information in which the heading angle is adjusted and lateral wave frequency information to the following vehicles FV1 to FVn.

Figure 9:
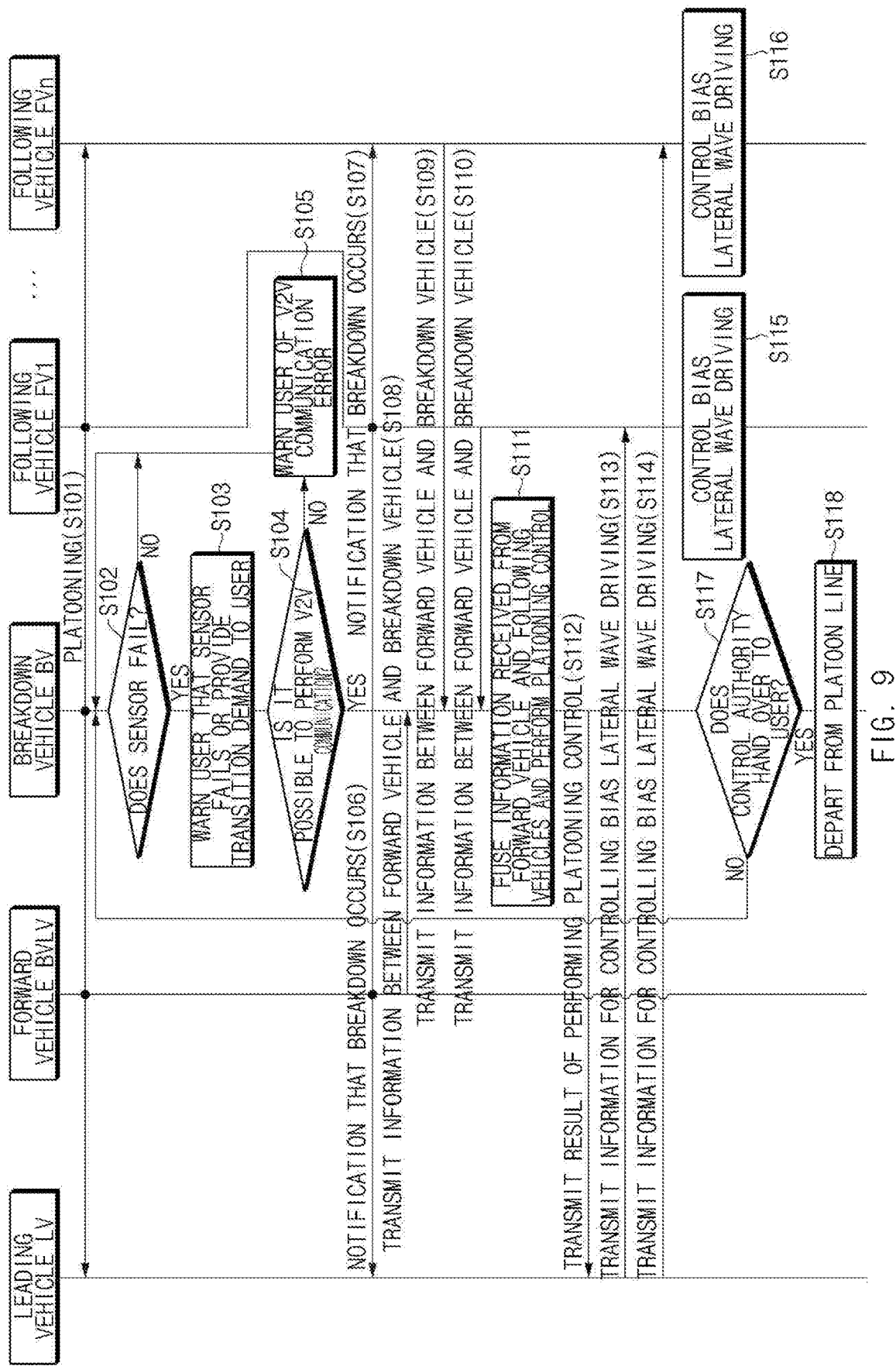
FIG. 9 is a flowchart illustrating a platooning control method according to an exemplary embodiment of the present invention.

Hereinafter, a description will be provided in detail of a platooning control method according to an exemplary embodiment of the present invention with reference to FIG. 9. FIG. 9 is a flowchart illustrating a platooning control method according to various exemplary embodiments of the present invention.

It is assumed that a platooning controller 100 of FIG. 1, mounted on each of a leading vehicle LV, a forward vehicle BVFV, a breakdown vehicle BV, and following vehicles FV1 to FVn, performs a process of FIG. 9. Furthermore, in a description of FIG. 9, an operation referred to as being performed by each of the leading vehicle LV, the forward vehicle BVFV, the breakdown vehicle BV, and the following vehicles FV1 to FVn may be understood as being controlled by a processor 140 of the platooning controller 100.

FIG. 9 illustrates an example of continuing performing platooning control when there are failures in at least one or more breakdown vehicles among vehicles while vehicles in the platooning group perform platooning.

When a following vehicle which is traveling behind the forward vehicle BVFV during platooning detects a failure of its sensor in S102, in S103, the breakdown vehicle BV including the sensor which fails may warn a user (the user which is driving the breakdown vehicle BV) that the sensor fails or may provide a transition demand to the user. In other words, when the sensor fails, the breakdown vehicle BV may hand over control authority to the user for safe driving or may maintain platooning during a certain time period to move to a safe place.

In S104, the breakdown vehicle BV may determine whether it is possible to perform its V2V communication. When it is impossible to perform the V2V communication, in S105, the breakdown vehicle BV may warn the user of a V2V communication error. In the instant case, the breakdown vehicle BV may determine a state where a V2V communication signal is transmitted and received to determine it is possible to perform communication. Furthermore, the breakdown vehicle BV may warn the user of a V2V communication error state by a display 130, an ON/OFF lamp, or the like.

In the instant case, each of vehicles which belong to a platooning group may check whether there is a failure in its sensor or its vehicle-to-everything (V2X) communication function per predetermined period.

When it is possible to perform the V2V communication, in S106 and S107, the breakdown vehicle BV may notify vehicles (e.g., the leading vehicle LV, the forward vehicle BVFV, and the following vehicles FV1 to FVn) in the platooning group that there is a breakdown in the breakdown vehicle BV.

In S108, S109, and S110, the forward vehicle BVFV and the following vehicles FV1 to FVn may determine information related to a distance, a relative speed, and relative acceleration between the forward vehicle BVFV and the breakdown vehicle BV and may transmit the determined information to the breakdown vehicle BV.

In S111, the breakdown vehicle BV may fuse a plurality of information received from the forward vehicle BVFV and the following vehicles FV1 to FVn and may perform platooning control. In other words, the breakdown vehicle BV may receive information related to a distance between the forward vehicle BVFV and the breakdown vehicle BV, a speed of the breakdown vehicle BV, and acceleration of the breakdown vehicle BV from the forward vehicle BVFV and the respective following vehicles FV1 to FVn and may perform platooning control of the breakdown vehicle BV using a mean value of the information received from the forward vehicle BVFV and the following vehicles FV1 to FVn.

In S112, the breakdown vehicle BV may transmit the result of performing the platooning control to the leading vehicle LV. To prevent each of the following vehicles FV1 to FVn from being hidden behind the vehicle in front of it and not recognizing the breakdown vehicle BV and the leading vehicle LV, in S113 and S114, the leading vehicle LV may transmit information such as a heading angle and a driving location of each following vehicle to the following vehicles FV1 to FVn to control bias lateral wave driving based on the result of performing the platooning control, received from the breakdown vehicle BV and the respective following vehicles FV1 to FVn.

In the instant case, in FIG. 9, an exemplary embodiment of the present invention is exemplified as the leading vehicle LV controls and adjusts bias lateral wave driving of the following vehicles FV1 to FVn. However, embodiments are not limited thereto. For example, the breakdown vehicle BV may control and adjust bias lateral wave driving of the following vehicles FV1 to FVn. Moreover, the breakdown vehicle BV may determine whether to receive information from first to nth following vehicles using information received from the following vehicles FV1 to FVn and may correct a bias value, a range of a heading angle, and a lateral wave frequency.

In S115 and S116, each of the following vehicles FV1 to FVn may control bias lateral wave driving based on platooning control information received from the leading vehicle LV. In S117, the breakdown vehicle BV may determine whether to hand over control authority to the user during platooning. In S118, the breakdown vehicle BV may stop platooning when handing over the control authority to the user and may depart from a platoon line. When the breakdown vehicle BV does not hand over the control authority to the user, S102 to S116 may be repeated.

In FIGS. 2 to 9, an exemplary embodiment of the present invention is exemplified as there is a failure in a following vehicle immediately behind a leading vehicle among platooning vehicles. However, embodiments are not limited thereto. For example, when there is a failure in a fourth following vehicle among following vehicles, a third following vehicle in immediately front of the following vehicle, the breakdown of which occurs, may be a forward vehicle. Information between the fourth following vehicle, the breakdown of which occurs, and the third following vehicle may be collected and used from a fifth following vehicle or a sixth following vehicle.

Accordingly, although there is a failure in a cognitive sensor of a following vehicle during platooning, an exemplary embodiment of the present invention may continue controlling platooning vehicles using information collected from following vehicles, thus continuing performing safe platooning in a response to a temporal or permanent failure in the sensor.

Figure 10:
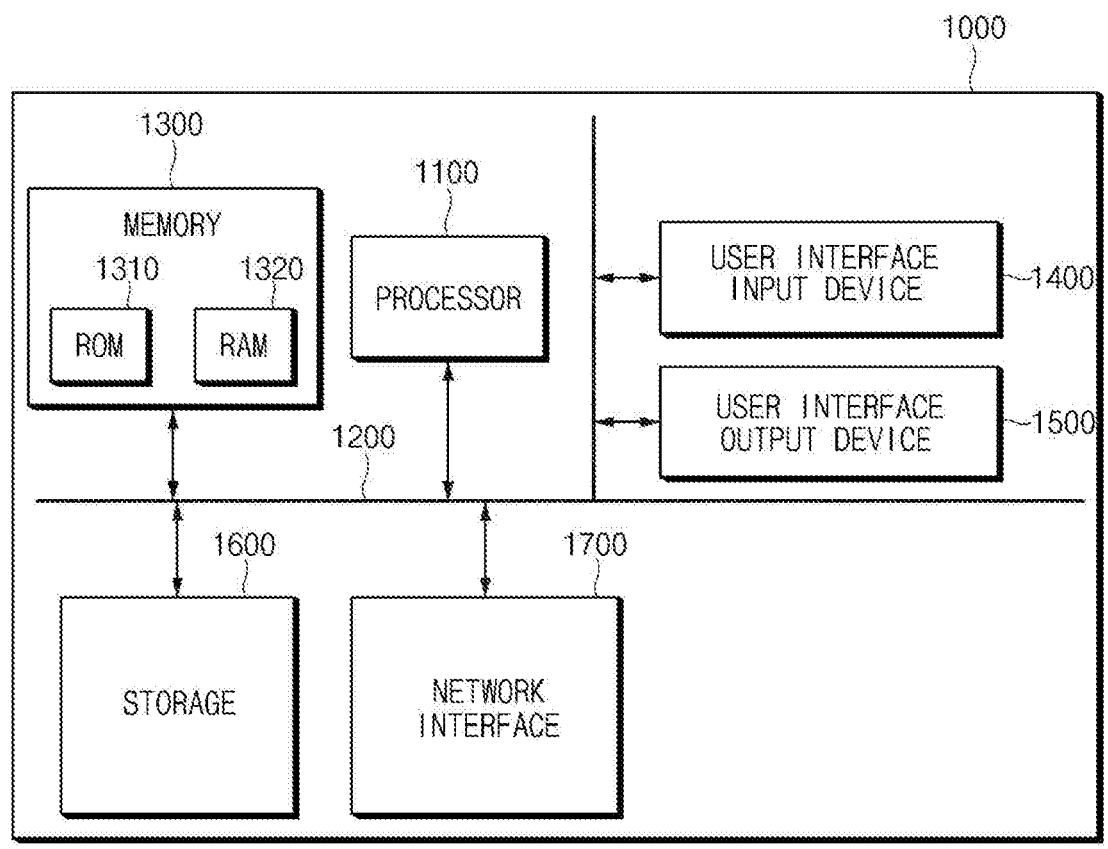
FIG. 10 is a block diagram illustrating a computing system according to an exemplary embodiment of the present invention.

FIG. 10 is a block diagram illustrating a computing system according to an exemplary embodiment of the present invention.

Referring to FIG. 10, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may collect information for platooning control from following vehicles which follow a breakdown vehicle when there is a failure in a sensor of at least one of platooning vehicles included in the platooning group during platooning and may continue performing safe platooning control.

Furthermore, various effects directly or indirectly ascertained through the present invention may be provided.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A platooning controller, comprising:
   a processor configured to determine when there is a failure in a sensor mounted in at least one platooning vehicle among a plurality of platooning vehicles forming a platooning group, to receive a plurality of information relating to a gap between a breakdown vehicle among the plurality of platooning vehicles, including the sensor which fails, in the platooning group and a forward vehicle among the plurality of platooning vehicles in front of the breakdown vehicle from the forward vehicle in front of the breakdown vehicle and one or more following vehicles among the plurality of platooning vehicles behind the breakdown vehicle, and to continue performing platooning control based on the received information; and
   a non-transitory storage configured for storing information received from the one or more following vehicles, wherein the processor is further configured to transmit information for controlling bias lateral wave driving of the one or more following vehicles to the one or more following vehicles.

2. The platooning controller of claim 1,
   wherein the processor is further configured to warn a user that the sensor fails or provide a transition demand to the user, in response to determining that the sensor fails.

3. The platooning controller of claim 1,
   wherein the processor is further configured to determine when it is possible to perform vehicle-to-vehicle (V2V) communication, in response to determining that the sensor fails.

4. The platooning controller of claim 1,
   wherein the processor is further configured to notify the forward vehicle and the one or more following vehicles in the platooning group that the sensor fails, in response to determining that the sensor fails.

5. The platooning controller of claim 1,
   wherein the processor is further configured to receive and fuse the plurality of information relating to the gap between the breakdown vehicle and the forward vehicle in front of the breakdown vehicle from the forward vehicle in front of the breakdown vehicle and the one or more following vehicles which follow the breakdown vehicle.

6. The platooning controller of claim 5, wherein the processor is further configured to:
   determine a mean value of the plurality of information between the breakdown vehicle and the forward vehicle in front of the breakdown vehicle, the plurality of information relating to the gap being received from the forward vehicle in front of the breakdown vehicle and the one or more following vehicles; and
   perform the platooning control of the breakdown vehicle based on the mean value.

7. The platooning controller of claim 1,
   wherein the information for controlling the bias lateral wave driving of the one or more following vehicles includes information related to lateral locations of the one or more following vehicles or information related to heading angles of the one or more following vehicles.

8. The platooning controller of claim 1,
   wherein the processor is further configured to control the bias lateral wave driving of the one or more following vehicles, such that the breakdown vehicle and the forward vehicle in front of the breakdown vehicle are included in a sensing area by sensors of the one or more following vehicles.

9. The platooning controller of claim 1,
   wherein the processor is further configured to determine information related to a distance, a relative speed, and relative acceleration between the breakdown vehicle and the forward vehicle in front of the breakdown vehicle and transmit the determined information to the breakdown vehicle, when receiving a notification that a breakdown occurs from the at least one platooning vehicle among the plurality of platooning vehicles in the platooning group.

10. The platooning controller of claim 9,
    wherein the processor is further configured to determine the distance between the breakdown vehicle and the forward vehicle in front of the breakdown vehicle based on a distance between a host vehicle among the plurality of platooning vehicles and the breakdown vehicle and a length of the breakdown vehicle, and a distance between the host vehicle among the plurality of platooning vehicles and the forward vehicle in front of the breakdown vehicle.

11. The platooning controller of claim 9,
    wherein the processor is further configured to determine a relative speed between the host vehicle and the breakdown vehicle.

12. The platooning controller of claim 1,
    wherein the processor is further configured to receive and fuse a plurality of information between the breakdown vehicle and the forward vehicle in front of the breakdown vehicle from another vehicle which does not belong to the platooning group as well as the one or more following vehicles.

13. A vehicle system, comprising:
    a sensing module configured to detect information for platooning control; and
    a platooning controller configured to determine when there is a failure in the sensing module of at least one platooning vehicle among a plurality of platooning vehicles, to receive a plurality of information relating to a gap between a breakdown vehicle among the plurality of platooning vehicles, including the sensing module which fails, and a forward vehicle in front of the breakdown vehicle among the plurality of platooning vehicles from the forward vehicle in front of the breakdown vehicle and one or more following vehicles behind the breakdown vehicle among the at least one platooning vehicle, and continue performing the platooning control, wherein the platooning controller is further configured to transmit information for controlling bias lateral wave driving of the one or more following vehicles to the one or more following vehicles.

14. A platooning control method, comprising:
- determining, by a platooning controller, when there is a failure in a sensor mounted in at least one platooning vehicle among a plurality of platooning vehicles forming a platooning group;
- notifying, by the platooning controller, a forward vehicle among the plurality of platooning vehicles in front of a breakdown vehicle among the plurality of platooning vehicles, including the sensor which fails, and one or more following vehicles behind the breakdown vehicle among the plurality of platooning vehicles that the sensor fails, in response to determining that the sensor fails;
- receiving, by the platooning controller, a plurality of information between the breakdown vehicle and the forward vehicle in front of the breakdown vehicle from the forward vehicle in front of the breakdown vehicle and the one or more following vehicles;
- fusing, by the platooning controller, the plurality of information received from the forward vehicle in front of the breakdown vehicle and the one or more following vehicles and performing platooning control; and
- transmitting, by the platooning controller, information for controlling bias lateral wave driving of the one or more following vehicles to the one or more following vehicles.

15. The platooning control method of claim 14, further including:
- warning, by the platooning controller, a user that the sensor fails or provide a transition demand to the user, in response to determining that the sensor fails; and
- determining, by the platooning controller, when it is possible to perform vehicle-to-vehicle (V2V) communication, in response to determining that the sensor fails.

16. The platooning control method of claim 14, wherein the fusing of the plurality of received information and the performing of the platooning control includes:
- determining a mean value of the plurality of information between the breakdown vehicle and the forward vehicle in front of the breakdown vehicle, the plurality of information being received from the forward vehicle in front of the breakdown vehicle and the one or more following vehicles; and
- performing the platooning control of the breakdown vehicle based on the mean value.

17. The platooning control method of claim 14, further including:
- controlling, by the platooning controller, the bias lateral wave driving of the one or more following vehicles, such that the breakdown vehicle and the forward vehicle in front of the breakdown vehicle are included in a sensing area by sensors of the one or more following vehicles.

18. The platooning control method of claim 14, wherein the plurality of information between the breakdown vehicle and the forward vehicle include information related to a distance, a relative speed, and relative acceleration between the breakdown vehicle and the forward vehicle in front of the breakdown vehicle.

* * * * *